(12) United States Patent
Lee et al.

(10) Patent No.: US 9,244,493 B2
(45) Date of Patent: Jan. 26, 2016

(54) CHARGER

(71) Applicant: HON HAI PRECISION INDUSTRY CO., LTD., New Taipei (TW)

(72) Inventors: Chien-Hung Lee, New Taipei (TW); Shih-Chi Wong, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 129 days.

(21) Appl. No.: 14/200,032

(22) Filed: Mar. 7, 2014

(65) Prior Publication Data

US 2014/0320069 A1    Oct. 30, 2014

(30) Foreign Application Priority Data

Apr. 25, 2013  (TW) .............................. 102207573 U (51) Int. Cl.
| | |
|---|---|
| H02J 7/00 | (2006.01) |
| G06F 1/00 | (2006.01) |
| H01M 2/10 | (2006.01) |
| H04B 1/38 | (2015.01) |
| G06F 1/16 | (2006.01) |

(52) U.S. Cl.
CPC .............. *G06F 1/1632* (2013.01); *H01M 2/10* (2013.01); *H02J 7/0042* (2013.01); *H04B 1/38* (2013.01)

(58) Field of Classification Search
CPC ....... H02J 7/0042; H01M 2/10; G06F 1/1632; H04B 1/38
USPC ............................. 320/107; 455/573; 429/100
See application file for complete search history.

(56) References Cited

U.S. PATENT DOCUMENTS

| | | | | |
|---|---|---|---|---|
| 5,623,881 | A * | 4/1997 | Huang ................... | A47B 21/00 108/102 |
| 5,966,284 | A | 10/1999 | Youn et al. | |
| 6,493,220 | B1 * | 12/2002 | Clark ..................... | A47B 21/00 248/918 |
| 2002/0135793 | A1 * | 9/2002 | Walgrove, III ..... | G03G 15/6535 358/1.14 |
| 2005/0012007 | A1 * | 1/2005 | Chang ................ | A47B 21/0314 248/298.1 |
| 2007/0055116 | A1 * | 3/2007 | Clark ................... | A61B 5/0002 600/300 |

(Continued)

FOREIGN PATENT DOCUMENTS

| | | | |
|---|---|---|---|
| CN | 1952844 A | 4/2007 | |
| JP | 07178717 A * | 7/1995 | .............. B29C 47/12 |

(Continued)

*Primary Examiner* — Phallaka Kik
(74) *Attorney, Agent, or Firm* — Novak Druce Connolly Bove + Quigg LLP (57) ABSTRACT

A charger includes a main body and a keyboard module received in the main body. The main body includes a case, a printed circuit board and a fastening member received in the housing. The fastening member includes two fastening frames formed on two opposite sides of the housing. The keyboard module includes a supporting member, a keyboard assembly, and a flexible circuit board electrically connected with the printed circuit board. The keyboard assembly is disposed on the supporting member. Two opposite sides of one of the two fastening frames and the supporting member respectively define a guiding slot, and two opposite sides of another one of the two fastening frames and the supporting member respectively form a track. The two tracks are separately received in the corresponding guiding slots. The supporting member and the keyboard assembly can slide out from the housing along the tracks.

14 Claims, 6 Drawing Sheets

(56) References Cited

U.S. PATENT DOCUMENTS

| | | | | |
|---|---|---|---|---|
| 2008/0007212 A1* | 1/2008 | Theytaz | | H02J 7/0013 320/107 |
| 2008/0180060 A1* | 7/2008 | Odell | | G06F 1/266 320/115 |
| 2009/0267471 A1* | 10/2009 | Lu | | H05K 7/1489 312/334.1 |
| 2011/0025263 A1* | 2/2011 | Gilbert | | H02J 7/0044 320/108 |
| 2011/0279958 A1* | 11/2011 | Clark | | A61B 5/0002 361/679.02 |
| 2013/0169541 A1* | 7/2013 | Cabos | | B64D 43/00 345/168 |
| 2014/0059263 A1* | 2/2014 | Rosenberg | | G06F 13/00 710/303 |
| 2014/0132832 A1* | 5/2014 | Adams | | G06F 3/02 348/376 |

FOREIGN PATENT DOCUMENTS

| | | | | |
|---|---|---|---|---|
| JP | 11331332 A | * | 11/1999 | H04M 1/02 |
| WO | WO 2008143383 A1 | * | 11/2008 | G06F 1/16 |

\* cited by examiner

CHARGER

BACKGROUND

1. Technical Field

The present disclosure relates to a charger, and more particularly to a charger with a keyboard.

2. Description of Related Art

A hand-held electronic device needs to be equipped with a charger and a wireless keyboard. One solution to this dilemma has been to carry a separate charger and a wireless keyboard. That means carrying three things.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like reference numerals indicate the same or similar elements. It should be noted that references to "an" or "one" embodiment in this disclosure are not necessarily to the same embodiment, and such references can mean "at least one."

Figure 1:
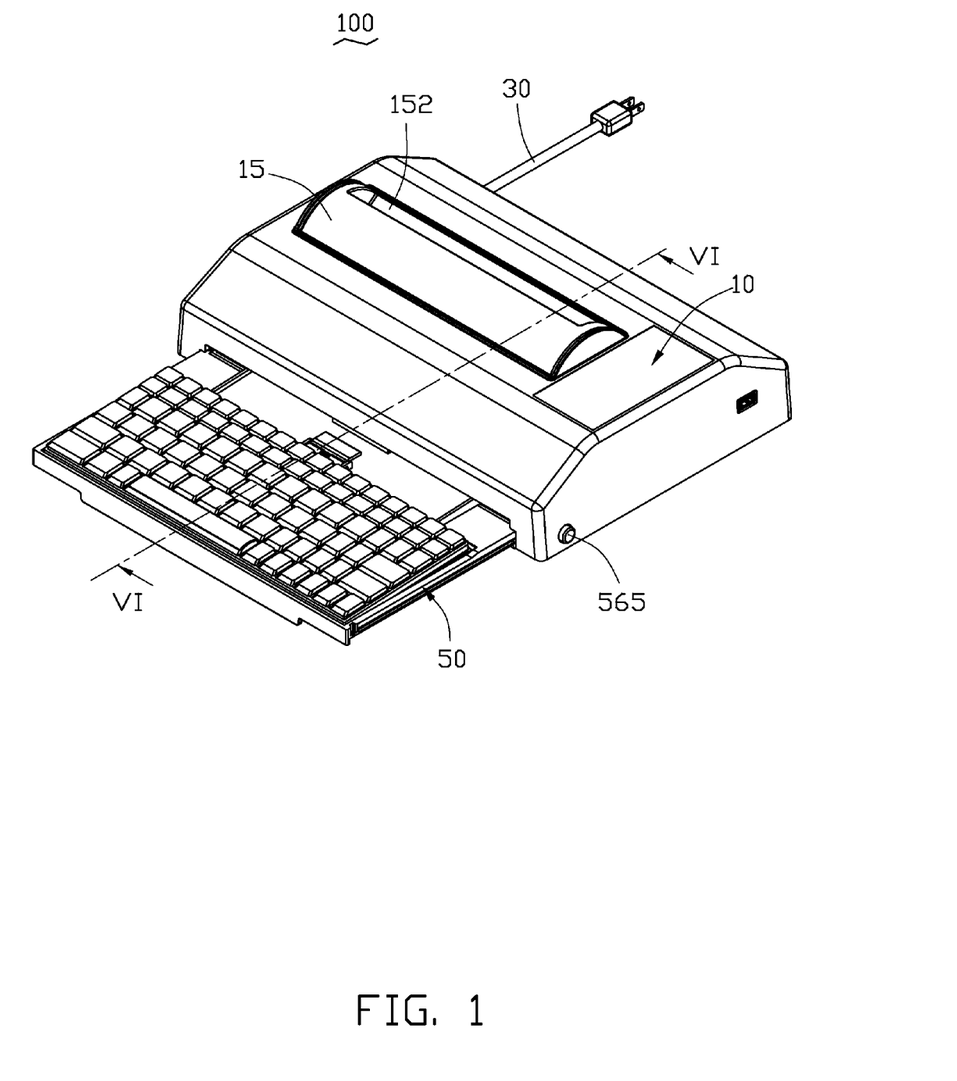
FIG. 1 is an isometric view of an embodiment of a charger.

FIG. 1 shows that a charger 100 includes a main body 10, a plug 30 and a keyboard module 50 received in the main body 10.

Figure 2:
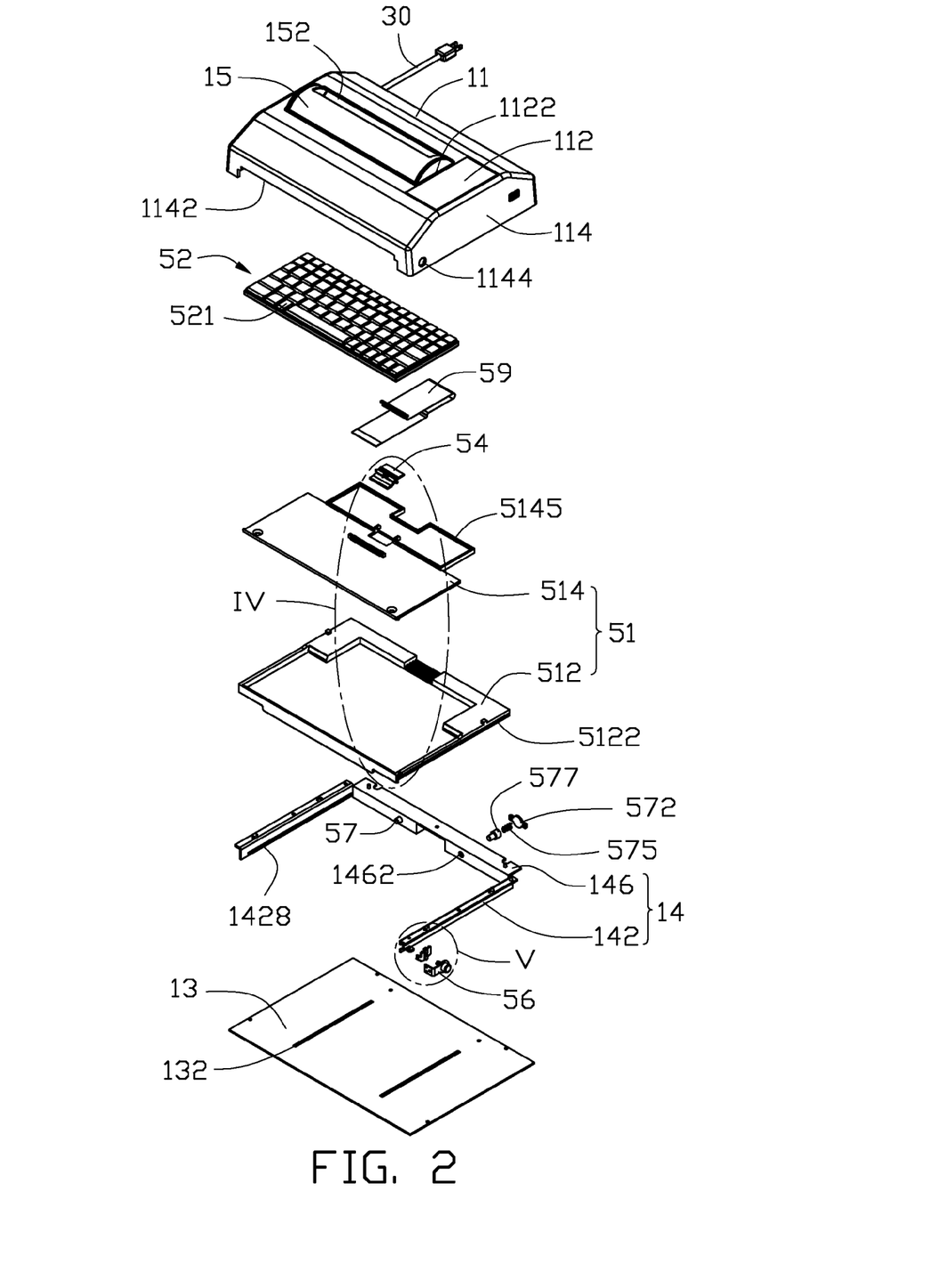
FIG. 2 is an exploded, isometric view of the charger of FIG. 1.
Figure 3:
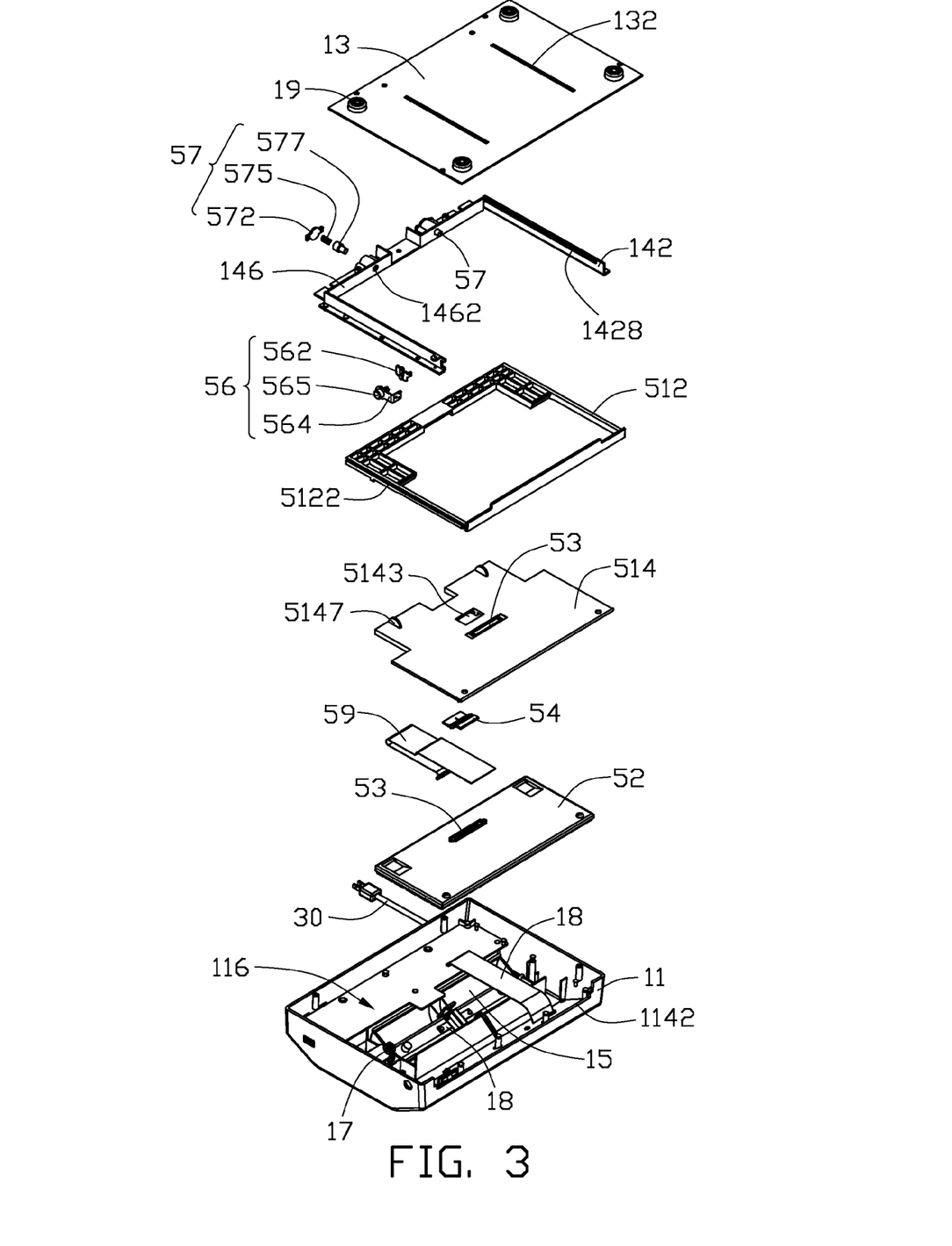
FIG. 3 is another exploded, isometric view of the charger of FIG. 1.

FIGS. 2 and 3 show that the main body 10 includes a case 11, a bottom cover 13, a fastening member 14, a rotating part 15, an adjusting piece 17, a plurality of printed circuit boards 18 and a plurality of supporting seats 19. The fasting member 14, the adjusting piece 17 and the plurality of printed circuit boards 18 are securely received in the case 11. The rotating part 15 is rotatably received in the case 11. The plurality of supporting seats 19 are set on the bottom cover 13.

The case 11 includes a roof 112 and four side walls 114 extending vertically from a periphery of the roof 112. The roof 112 and the four side walls 114 cooperatively define a housing space 116. A receiving groove 1122 communicating with the housing space 116 is defined in the middle of the roof 112. A fourth groove 1142 is defined on one of the four side walls 114. The keyboard module 50 passes through the fourth groove 1142 into the housing space 116. A second hole 1144 is defined on another one of the side walls 114. In the embodiment, the fourth groove 1142 may be a quadrate groove, the second hole 1144 is near the fourth groove 1142.

The bottom cover 13 includes two second grooves 132. The two second grooves 132 are parallel to each other. The direction of the second grooves 132 is perpendicular to the fourth groove 1142.

Figure 5:
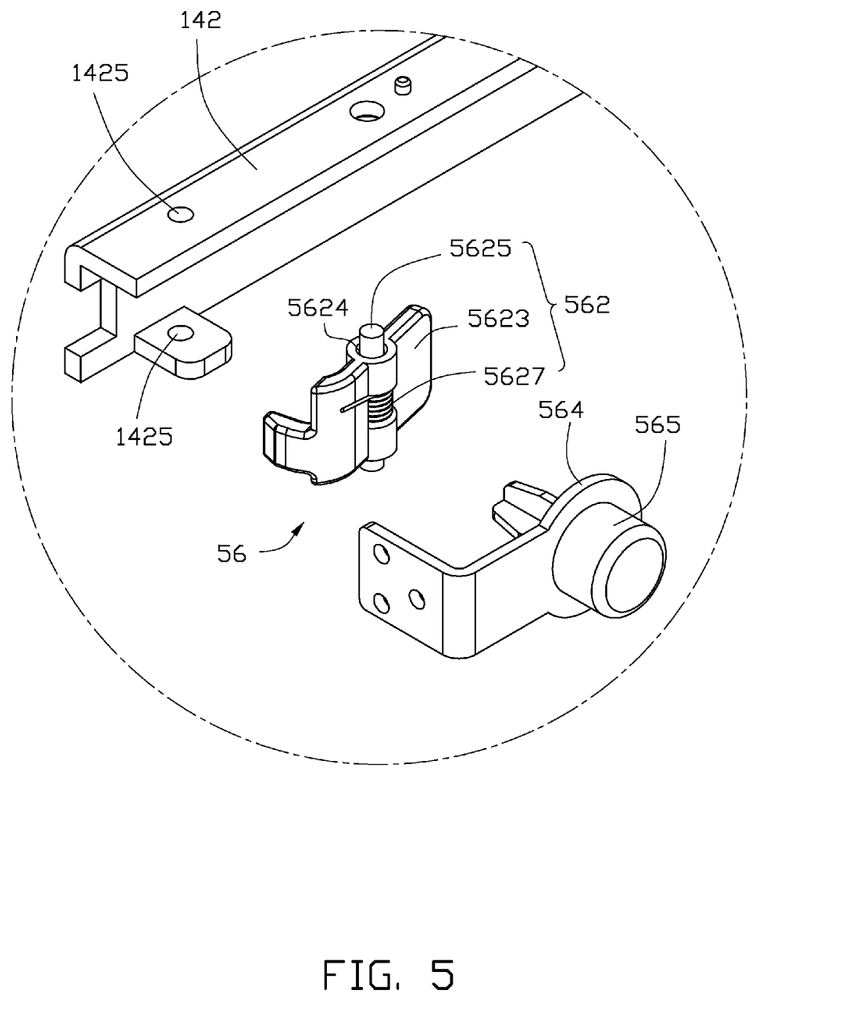
FIG. 5 is an enlarged view of another circled portion of the charger of FIG. 2.
Figure 6:
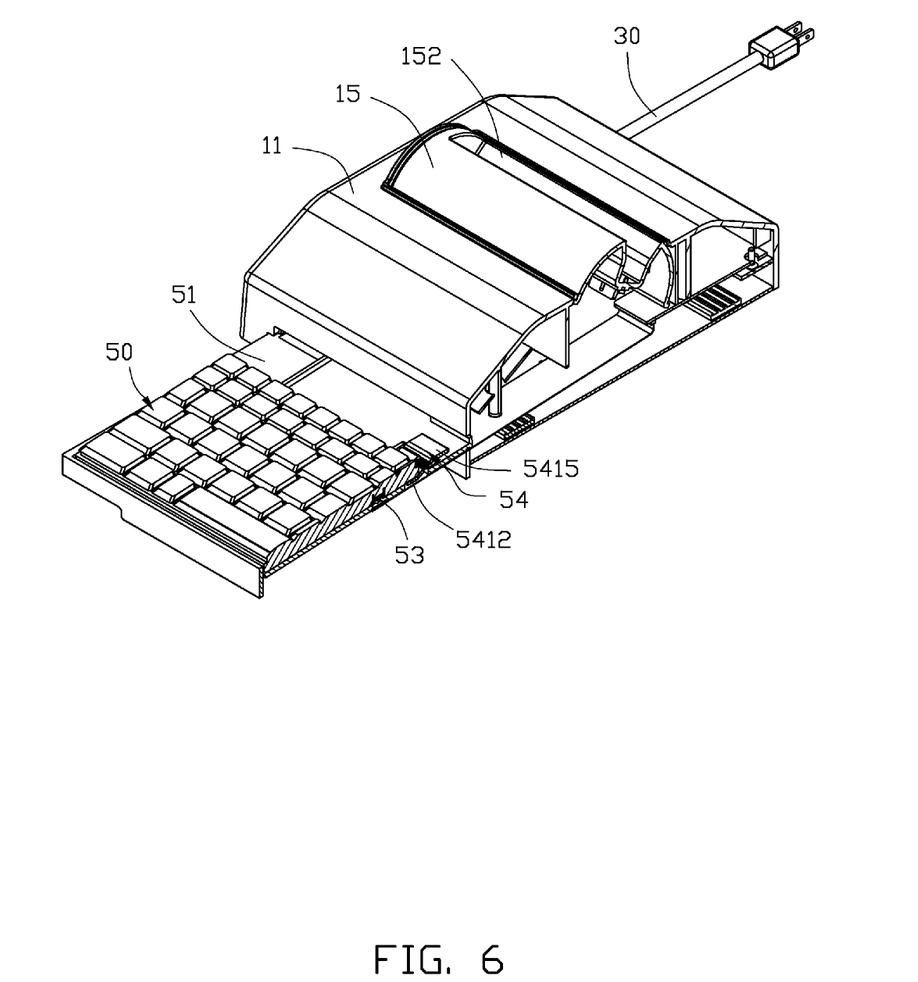
FIG. 6 is an isometric cross sectional view taken along line VI-VI of the charger of FIG. 1.

The fastening member 14 is firmly fixed on the case 11 and is received in the housing space 116. The fastening member 14 includes a pair of first frames 142 and a second frame 146. Each pair of first frames 142 includes two fastening holes 1425 (see FIG. 5), the fastening holes 1425 are located at one end of the first frames 142 away from the second frame 146. Each of the pair of first frames 142 further includes a track 1428. The second frame 146 includes two first holes 1462.

The rotating part 15 is rotatably received in the receiving groove 1122. The rotating part 15 includes a third groove 152 and a hand-held electronic device (not labeled) may be set in the third groove 152. The adjusting piece 17 is defined in an inner face of the roof 112 and is received in the housing space 116. The adjusting piece 17 is connected to the rotating part 15 and the printed circuit board 18. The printed circuit board 18 controls the rotation of the rotating part 15 to adjust the position of the hand-held electronic device. In the embodiment, the adjusting piece 17 may be a gear, and the rotating part 15 includes a gear coupled with the adjusting piece 17.

The plug 30 is electrically connected with the printed circuit board 18 to power the main body 10.

The keyboard module 50 includes a supporting member 51, a keyboard assembly 52, a pair of electrical connectors 53, a support member 54, a buckle assembly 56, a pair of pushing assemblies 57 and a flexible circuit board 59. The keyboard assembly 52, the pair of electrical connectors 53, the support member 54 and the flexible circuit board 59 are included on the supporting member 51. The buckle assembly 56 is located on the first frame 142 and cooperates with the supporting member 51 to receive the keyboard module 50 in the housing space 116. The pushing assembly 57 is secured on the second frame 146 to force the support member 51 and the keyboard assembly 52 out of the case 11.

The supporting member 51 is quadrate and is slidably mounted in the case 11. The supporting member 51 includes a support frame 512 and a support plate 514 which is received in the support frame 512. The support frame 512 is quadrate and is slidably received in the housing space 116 and the fourth groove 1142. A guiding slot 5122 is located on a side wall of the support frame 512, the guiding slot 5122 slides along the track 1428. The support frame 512 further includes a first groove 5124.

Figure 4:
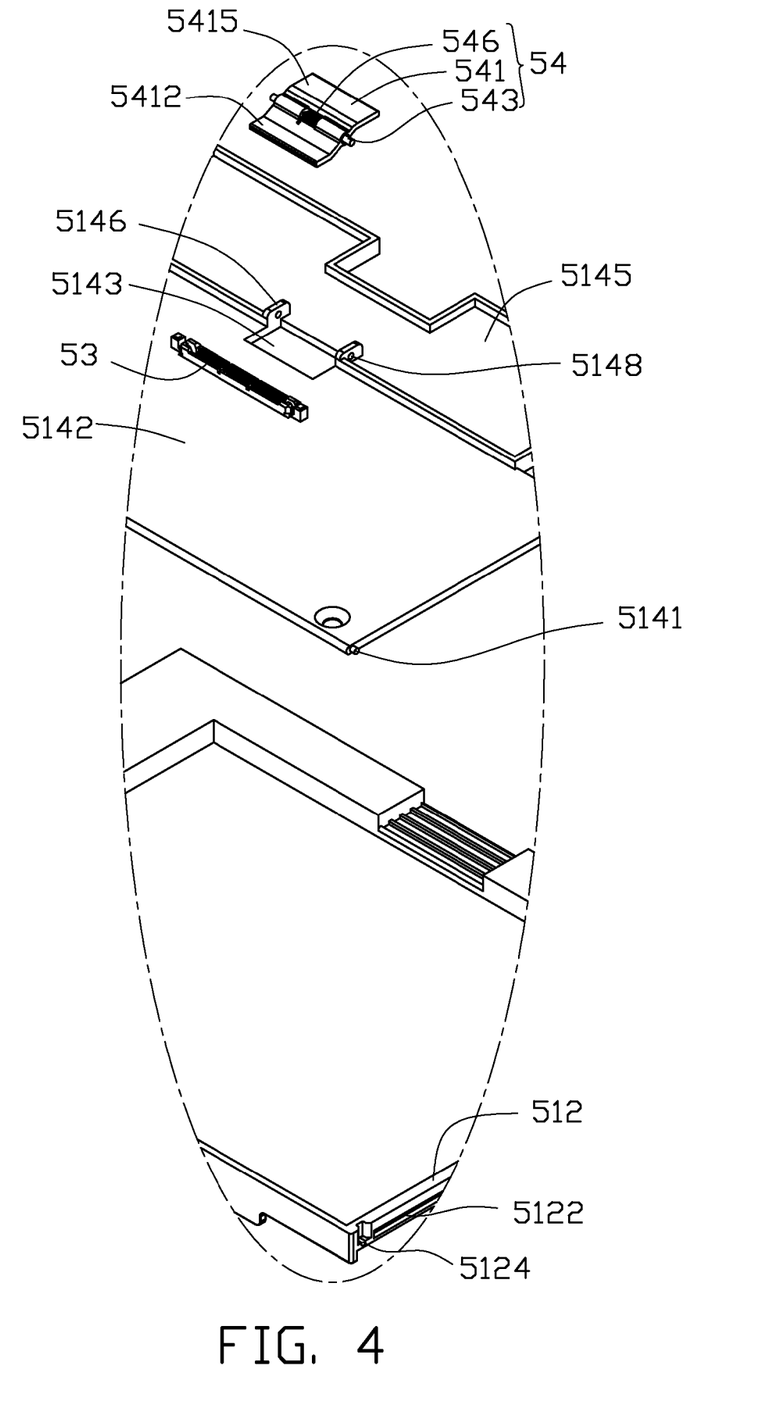
FIG. 4 is an enlarged view of a circled portion of the charger of FIG. 2.

The support plate 514 includes a support portion 5142, a pushing part 5145 and two lugs 5146 (see FIG. 4). The support portion 5142 is connected with the pushing part 5145. A shaft 5141 is located at a corner of the support portion 5142 far from the pushing part 5145. The shaft 5141 is rotatably received in the first groove 5124. A containing groove 5143 is defined on one end of the support portion 5142 close to the pushing part 5145. The support member 54 is received in the containing groove 5143. Two bumps 5147 are set on one end of the pushing part 5145 far from the support portion 5142. The bumps 5147 may be in a shape of arc and are partly received in the second grooves 132. Two lugs 5146 extending from two sides of the containing groove 5143 each define a third hole 5148.

The keyboard assembly 52 set on the supporting member 51 includes a keyboard 521 with BLUETOOTH. This will allow BLUETOOTH-enable keyboard 512 to wirelessly communicate with the hand-held electronic device set in the third groove 152.

One part of the electronic connector 53 is located on the support portion 5142, and another part of the electronic connector 53 is located on the keyboard 512.

The support member 54 is rotatably fixed on the lugs 5146 and includes a body 541, a spring 546 received in the body 541, and a bolt 543 extending through the spring 546. The body 541 includes a support part 5412 and a pressing part 5415 connected with the support part 5412. The support part 5412 is received in the containing groove 5143 and is located between the keyboard assembly 52 and the support portion 5142. The spring 546 is fixed on the body 541. The bolt 543 extends through the body 541 and is mounted in the first holes 1462.

The buckle assembly 56 rotatably set on one end of the first frame 142 includes a buckle 562, a buckle plate 564 and a button 565. The button 565 is engaged with the buckle 562 and is mounted in the buckle plate 564 and the second hole 1144. The buckle 562 includes a body 5623, a bolt 5625, a spring 5627 and a fourth hole 5624. The bolt 5625 is received in the fourth hole 5624 and extends through the spring 5627 and the fastening holes 1425, the spring 5627 is fixed on the body 5623.

The pushing assembly 57 which is secured on the second frame 146 includes a fixing piece 572, an elastic member 575 and a pushing member 577. The pushing assembly 57 abuts against the supporting member 51. The fixing piece 572 is fixed on the second frame 146. The elastic member 575 and the pushing member 577 are received in the first hole 1462. The elastic member 575 is under compression between the fixing piece 572 and the pushing member 577. The pushing member 577 resists against the pushing part 5145 to push the supporting member 51 out of the case 11 by the elastic force of the elastic member 575. In the embodiment, the elastic member 575 may be a spring.

The flexible circuit board 59 is positioned on the support plate 514 and is electrically connected to the printed circuit board 18 and the electrical connector 53 to charge the keyboard assembly 52.

In use of the charger, the hand-held electronic device is received in the third groove 152. The button 565 is pressed to make the buckle 562 free from the support frame 512. The elastic member 575 elastically recovers to push the pushing member to the supporting member 51 with the keyboard assembly 52 out of the case 11. The lugs 5146 slide along the second groove 132.

When pressing the pressing part 514 of the support member 54, the support part 5412 lifts up the keyboard assembly 52. The electric connector 53 located on the keyboard 521 is separated from the connector 53 located on the support plate 514. Then the keyboard 521 is taken out from the support plate 514. The keyboard 512 communicates with the hand-held electronic device wirelessly by BLUETOOTH.

The supporting member 51, with the keyboard assembly 52 is pushed into the case 11 after using the keyboard assembly. The buckle 562 locks the support frame 512 to receive the keyboard assembly 12 in the housing space 116.

The track 5122 can also be set on the support frame 512 and correspondingly the guiding slot 5122 may be defined in the first frame 142.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A charger, comprising:
a main body comprising a case, a bottom cover, a plurality of printed circuit boards, and a fastening member;
a plug supplying power for the main body; and
a keyboard module comprising a supporting member, a keyboard assembly located on the supporting member, and a flexible circuit board connected with the keyboard and the printed circuit board;
wherein the fastening member comprises a first frame fixed on two opposite sides of the case, a guiding slot defined on a selective one of the first frame and the supporting member, a track slidably received in the guiding slot is formed on the remaining one of the first frame and the supporting member, the supporting member and the keyboard assembly slide in and out of the case along the guiding slot.

2. The charger of claim 1, wherein the keyboard module further comprises a buckle assembly, the buckle assembly comprises a buckle, a buckle plate and a button, the buckle rotatably located at one corner of the first frame and engaged with the supporting member, an end of the buckle plate is secured on the case, the button extends through the buckle plate and is engaged with the buckle, and the supporting member is removed from the buckle by pressing the button.

3. The charger of claim 2, wherein the buckle comprises a body, a bolt and a spring, wherein an end of the body is engaged with the supporting member, another end of the body engaged with the button, the bolt rotatably extends through the body, and the spring is secured on the first frame.

4. The charger of claim 2, wherein the fastening member further comprises a second frame connected to the first frame, the keyboard module further comprises a pushing assembly defined on the second frame and engaged with the supporting member, and the pushing assembly promotes the supporting member and the keyboard assembly out of the case when the buckle being free from the supporting member.

5. The charger of claim 4, wherein the second frame defines a second hole, the pushing assembly comprises a fixing piece fixed on the second frame, a pushing member received in the second hole and an elastic member located between the fixing piece and the pushing member, and wherein the pushing member is engaged with the supporting member.

6. The charger of claim 1, wherein the supporting member comprises a support frame and a support plate, the support frame comprises a guiding slot and a first groove, and the support plate comprises a shaft rotatably received in the first groove.

7. The charger of claim 6, wherein the support plate comprises a support portion and a pushing part connected with the support portion, the bottom cover comprises two second grooves parallel to each other, the keyboard assembly is located on a side of the support portion, two bumps is defined on another side of the support portion corresponding to the two second grooves and is slidably received in the two second grooves.

8. The charger of claim 7, wherein the support plate further comprises a pair of lugs extending from the connection part of the support portion and the pushing part and a containing groove adjacent to the pushing part.

9. The charger of claim 7, wherein the keyboard module further comprises an electrical connector and a support member, the electrical connector is located on the keyboard assembly and the support portion and is electrically connected with the flexible circuit board.

10. The charger of claim 9, wherein the support member comprises a body and a bolt, the body comprises a support part and a pressing part connected with the support part, the bolt extends through a connection of the support part and the pressing part and is secured on the lugs, the support part is received in the containing groove and located between the keyboard assembly and the support portion.

11. The charger of claim 9, wherein the side walls comprises a fourth groove, and the supporting member with the keyboard assembly slide out and into the case along the fourth groove.

12. The charger of claim 1, wherein the main body further comprises a rotating part and an adjusting part, and the case further comprises a roof and four side walls extending vertically along a periphery of the roof.

13. The charger of claim 12, wherein the roof and the four side walls cooperatively define a housing space, the keyboard module is received in the housing space, the roof defines a receiving groove communicating with the housing space, and the rotating part is received in the receiving groove.

14. The charger of claim 13, wherein the rotating part comprises a third groove for holding an hand-held electrical device, the adjusting part is received in the housing space and cooperates with the rotating part, and the printed circuit board controls the rotation part to drive the hand-held electrical device to rotate.

* * * * *